US007244328B1

(12) United States Patent
Robbins, Sr. et al.

(10) Patent No.: US 7,244,328 B1
(45) Date of Patent: Jul. 17, 2007

(54) COMPOSITE DOOR, DOOR CORE AND METHOD OF MANUFACTURE

(75) Inventors: Gary Robbins, Sr., Springfield, IL (US); Gary Robbins, Jr., Springfield, IL (US)

(73) Assignee: Inno-Tech Plastics, Inc., Springfield, IL (US)

( * ) Notice: Subject to any disclaimer, the term of this patent is extended or adjusted under 35 U.S.C. 154(b) by 393 days.

(21) Appl. No.: 10/920,871

(22) Filed: Aug. 18, 2004

Related U.S. Application Data

(60) Provisional application No. 60/496,953, filed on Aug. 21, 2003, provisional application No. 60/526,036, filed on Dec. 1, 2003.

(51) Int. Cl.
*E06B 33/88* (2006.01)
*B32B 37/00* (2006.01)

(52) U.S. Cl. ........................ 156/257; 156/42; 156/254; 156/264; 156/268; 156/304.5; 156/512; 144/346; 144/347; 144/350; 144/360; 52/800.12

(58) Field of Classification Search .................. 156/42, 156/254, 264, 257, 268, 304.5, 512; 144/346, 144/347, 350, 360; 425/307, 297; 52/800.12; 409/131; 83/23
See application file for complete search history.

(56) References Cited

U.S. PATENT DOCUMENTS 3,271,919 A * 9/1966 Olton ...................... 52/800.13
4,159,302 A 6/1979 Greve et al.
4,343,127 A 8/1982 Greve et al.
4,748,771 A 6/1988 Lehnert et al.
5,135,597 A * 8/1992 Barker ....................... 156/264
5,860,268 A 1/1999 McWilliams
6,395,205 B1 5/2002 Huege et al.
6,409,855 B1 * 6/2002 Gregg et al. .................. 156/43
6,606,831 B2 8/2003 Degelsegger
6,615,544 B1 9/2003 Tlemcani et al.
6,622,449 B2 9/2003 Smith et al.
6,643,991 B1 11/2003 Moyes
6,648,965 B2 11/2003 Klus
6,668,499 B2 12/2003 Degelsegger
6,705,047 B2 3/2004 Yulkowski
6,846,358 B2 1/2005 Francis
2003/0200714 A1 10/2003 Minke et al.
2004/0003559 A1 1/2004 Minke et al.

OTHER PUBLICATIONS

ASTM—C 1386-98—Standard Specification for Precast Autoclaved Aerated Concrete (PAAC) Wall Construction Units Sep. 1998.
Aerated Concrete Corporation of America—Material Characteristics Undated.
Sider—Oxydro, Inc.—Sider-Mortar AAC Sep. 9, 2003.

* cited by examiner

*Primary Examiner*—Linda Gray
(74) *Attorney, Agent, or Firm*—Wood, Phillips, Katz, Clark & Mortimer

(57) ABSTRACT

A method for making the core of a door of autoclaved aerated concrete (AAC). A billet of AAC is provided from which slabs are cut to the approximate dimensions of the door core. A reinforcing band is secured about the perimeter of a slab. The thickness of the slab is then sized for the door core as by sanding. The door is finished by applying skins to the core surfaces and trim to the reinforcing band.

2 Claims, 4 Drawing Sheets

60
22
32
28
60
34
26
30
34

COMPOSITE DOOR, DOOR CORE AND METHOD OF MANUFACTURE

CROSS REFERENCE TO RELATED APPLICATIONS

This application is a continuation-in-part of our provisional application Ser. Nos. 60/496,953 filed Aug. 21, 2003 and 60/526,036 filed Dec. 1, 2003.

BACKGROUND OF THE INVENTION

It is known to manufacture special purpose doors, as fire doors, with a core of light weight concrete. Such doors have typically been manufactured by casting a core from raw materials and, after the core has cured, finishing the doors as with surface and edge coverings. Casting and curing are time consuming and require a large facility to accommodate raw materials and the cast cores while they cure. The lightweight concretes which have been used in the cores of doors have not provided an optimum combination of fire protection and core density.

BRIEF SUMMARY OF THE INVENTION

The composite door and method of manufacture of this invention preferably utilizes a core material of autoclaved, aerated concrete (sometimes referred to herein as AAC).

In accordance with method, a billet of AAC is provided having a length and width approximating the intended dimensions of the door and a thickness approximating the thickness of two or more doors. Slabs are cut from the billet, each having a length and width forming a perimeter and a thickness approximating the intended thickness of the door. A reinforcing band is secured about the perimeter of each slab, forming a core for a door. A door is finished with optional trim for the reinforcing band and skins covering the surfaces of the core. The banded slabs, i.e., cores, can be sold in unfinished form to a door manufacturer who performs the finishing.

Precast AAC units are commonly used as wall, floor and roof sections in building construction. Plants are located throughout the country which specialize in the manufacture of AAC units. The cured billets from which the door cores are manufactured may be obtained from such a plant. This eliminates the need for a door manufacturing operation to provide an AAC casting and curing facility.

The autoclaved, aerated concrete core material may have a cured density of the order of 30–50 lb/ft.$^3$ and preferably about 35–40 lb/ft.$^3$. This affords an optimum combination of fire resistance, R value, physical strength and door weight.

Further features and advantages of the door and its method of manufacture will be apparent from the drawings and the following description.

DETAILED DESCRIPTION OF THE INVENTION

Figure 1:
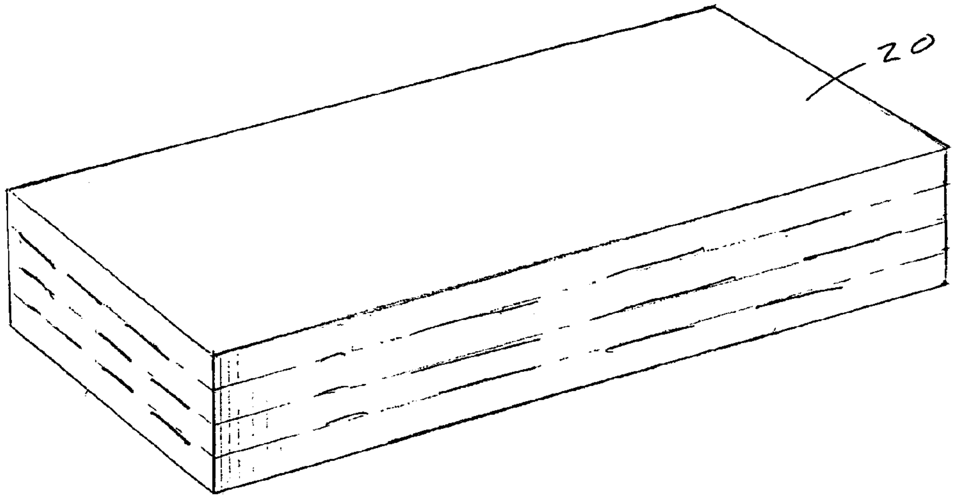
FIG. 1 is a perspective view of a billet of AAC from which a plurality of door cores are manufactured.

The manufacture of a concrete core for a door is expedited by initially providing a billet 20, FIG. 1, of cured, aerated or lightweight concrete. Billet 20 has length and width dimensions which approximate but are slightly greater than the intended height and width of the door core. The thickness of the billet approximates and is slightly greater than the thickness of a plurality of door cores as indicated by the dashed lines. Preferably, the billet is of an autoclaved, aerated lightweight concrete (AAC). Conveniently, a door manufacturer may secure the billet 20 from a manufacturer of AAC. This avoids the need for the door manufacturer to invest money, facilities and time in the production of the AAC billets. Rather, the door manufacturer concentrates its efforts and assets on the manufacture of door cores and finished doors.

Figure 2:
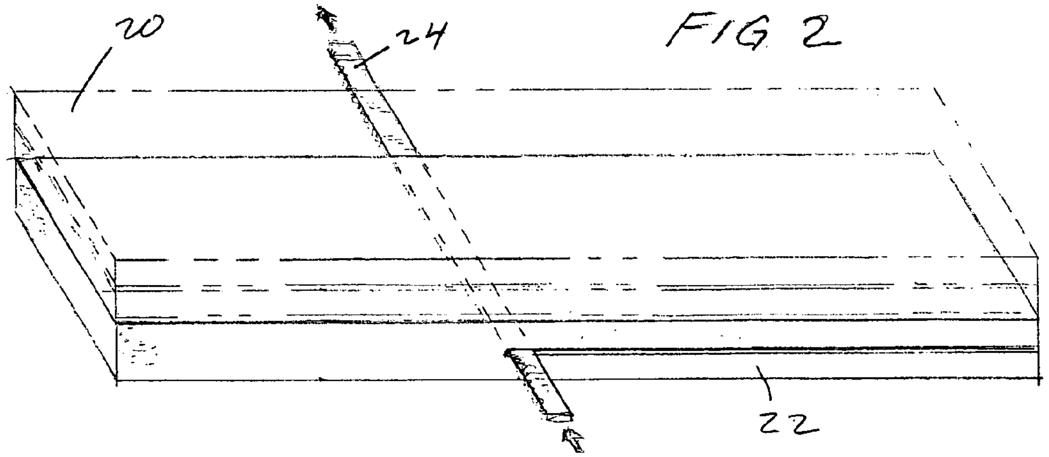
FIG. 2 is a perspective view of a billet of AAC showing a slab cut therefrom to manufacture a door core.

A concrete slab 22 is cut from billet 20 as with a band saw 24, FIG. 2. Slab 22 has a length and width which approximate but are greater than the height and width of the door core. The thickness of slab 22 approximates but is greater than the thickness of the door core.

Figure 14:
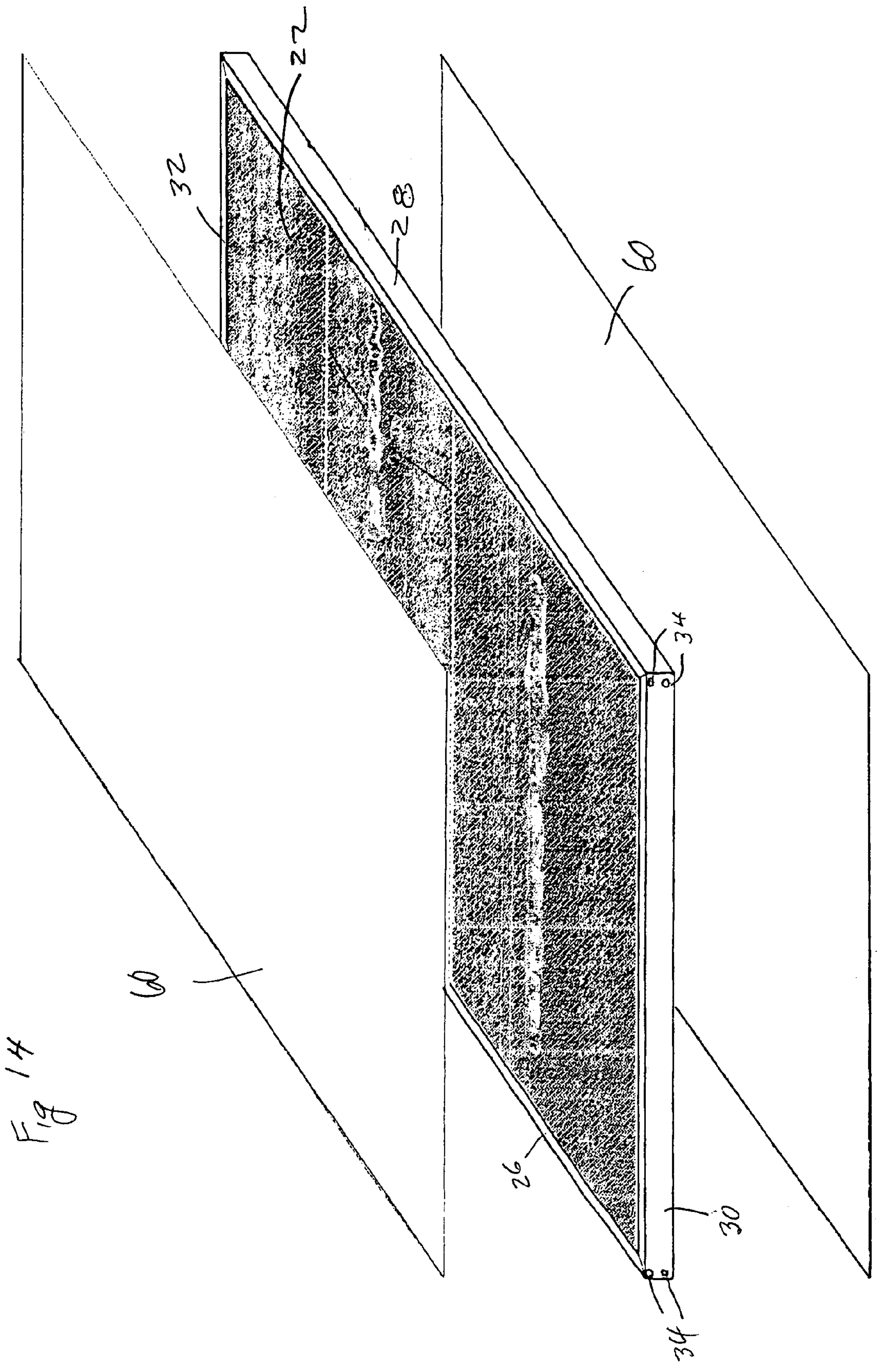
FIG. 14 is an exploded perspective of the door.

Handling of the door core 22 of cured aerated concrete, without damage to the concrete, is facilitated by application of a peripheral reinforcing band to the perimeter of slab 22. A preferred reinforcing band is a steel strip, as of 18, 20 or 22 gauge steel. The strip is roll formed with a U-shaped channel cross section having two parallel legs with a length of ¼"–½". The steel reinforcing band is typically constructed of two stile sections for the edges of the core which will be the vertical edges of the door and two rail sections for the edges of the core which will be the top and bottom of the door. The stiles are shown at 26, 28, FIG. 14 and the rails at 30, 32. The reinforcing band sections are riveted together and are glued to the edges of the core. The stiles in FIG. 14 have short tabs (not shown) which mate with the adjoining rails and receive rivets 34.

The slab 22, after being cut from billet 20, is sized and configured for the internal dimensions of the reinforcing band. To accomplish this, one or both of the vertical edges may be cut or sanded to achieve the desired width of the banded core. Similarly, one or both of the horizontal edges is cut or sanded to achieve the desired height of the banded core.

Figure 3:
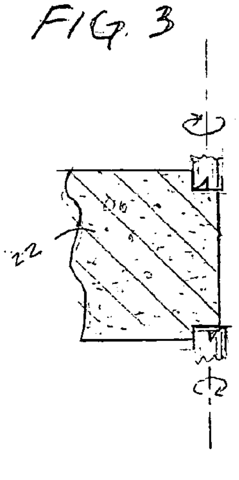
FIG. 3 is a fragmentary section of a slab showing a tool routing the slab surface at an edge.
Figure 4:
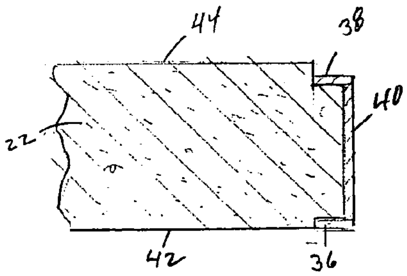
FIG. 4 is fragmentary section of the slab of FIG. 3 with a reinforcing band secured thereto.
Figure 5:
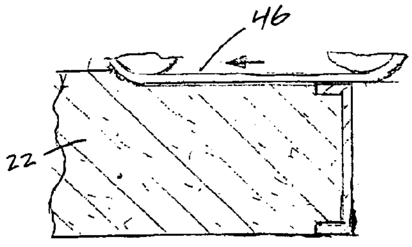
FIG. 5 is a fragmentary section of the slab of FIG. 4 showing the upper surface being sanded to its final dimension.

The edges of the slab surfaces are routed as shown in FIG. 3 to receive the legs 36, 38 of band 40. Band leg 36 is flush with the lower slab surface 42 and the upper slab surface 44 intentionally extends above leg 38. The thickness of the slab is then sized to match the upper leg 38 of band 40 as by sanding the upper surface with a belt or drum sander. Belt sander 46 is shown in FIG. 5. This completes the manufacture of the door core. The banded core may be finished or sold to a door finisher.

Figure 6:
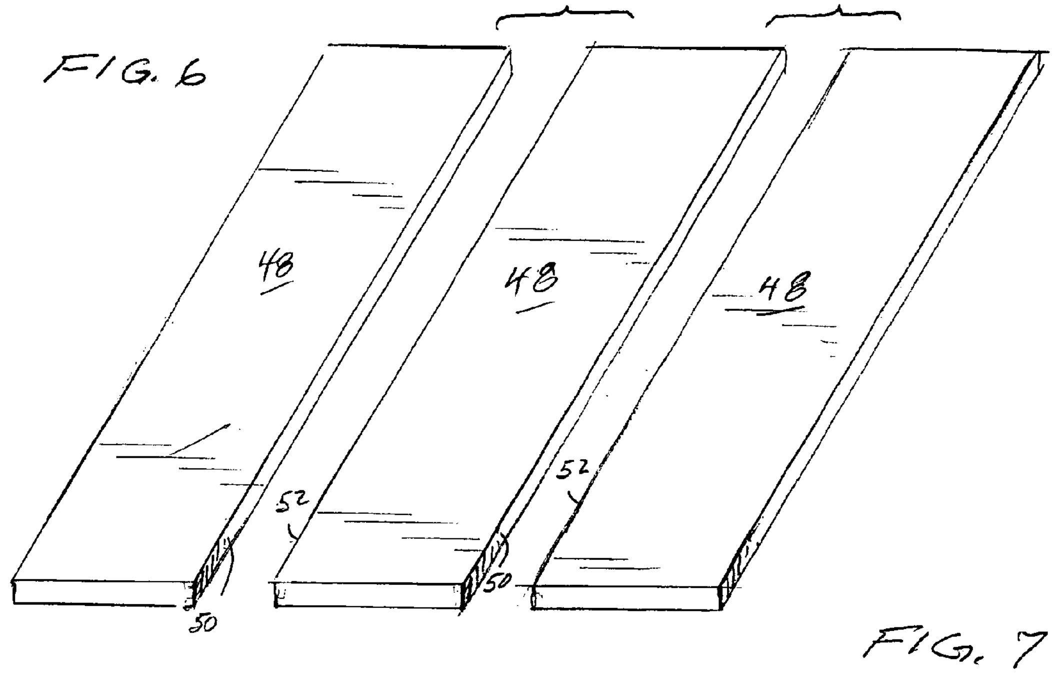
FIG. 6 is a perspective view illustrating a plurality of slab sections to be joined to form a door core.
Figure 7:
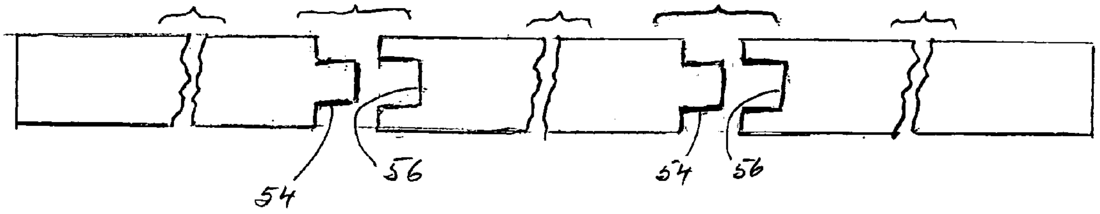
FIG. 7 is an edge view of the slab sections of FIG. 6.

A billet 20 sized for a door may be too large and heavy to handle conveniently. Accordingly, the billet may have a length which is a fraction, as ⅓, the height of the intended door. Three slab sections 48 are cut from one or more billets and joined together as shown in FIGS. 6 and 7. The mating edges 50, 52 of the slab sections 48 preferably have interlocking surfaces, as the tongue and groove configuration 54, 56 shown in FIG. 7. Other interlocking surfaces, as a tenon and mortise, for example, may be used. The slab sections 48 are secured together by applying an adhesive, as a glue mortar, to the mating surfaces 50, 52.

Figure 8:
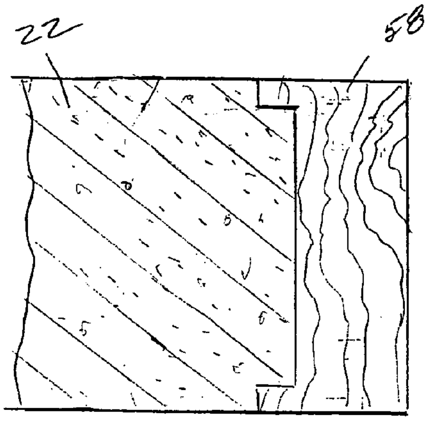
FIG. 8 is a fragmentary section showing a door core with a wooden reinforcing band.
Figure 9:
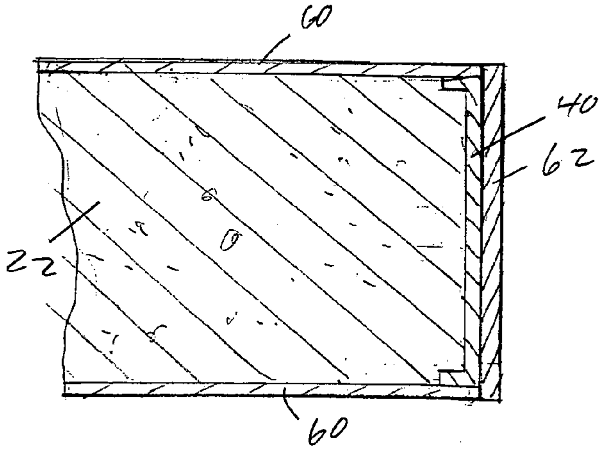
FIG. 9 is a fragmentary section of a door core with surface skins and edge trim.

An alternate reinforcing band 58 of wood is shown in FIG. 8. The alternate band might also be plastic or a wood-plastic composite. However, where fire resistance of the door is an important consideration, the steel band 40 is preferred.

The banded core may be finished as by applying skins 60 to the core surface and, if desired, trim strip 62 to reinforcing band 40. The skins may be of steel, plastic, wood or a plastic and wood fiber composite and are typically secured to the core surface by glue. The glue may be applied with a roller coater. Alternately, the reinforcing band may be finished by painting. The skins shown are flat. However, profiled skins may be used. The surfaces of the core may be routed to mate with the skins.

Figure 10:
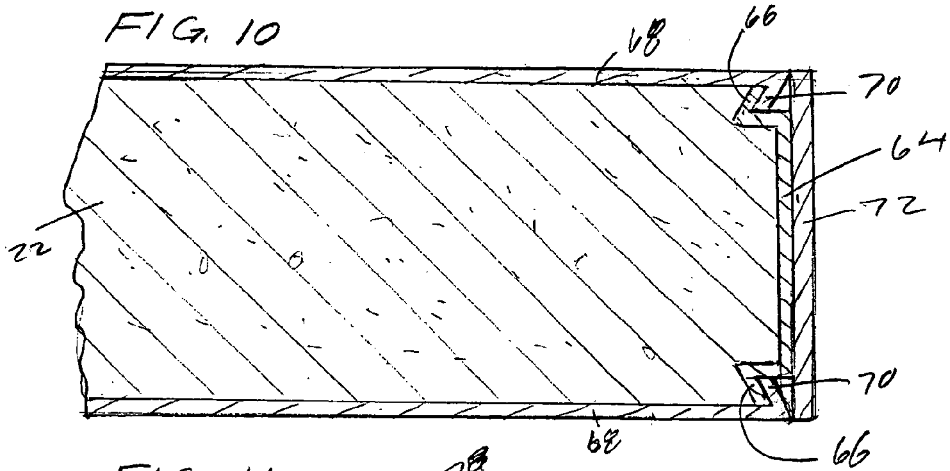
FIG. 10 is a fragmentary section of a door core with another form of reinforcing band with surface skins and edge trim.
Figure 11:
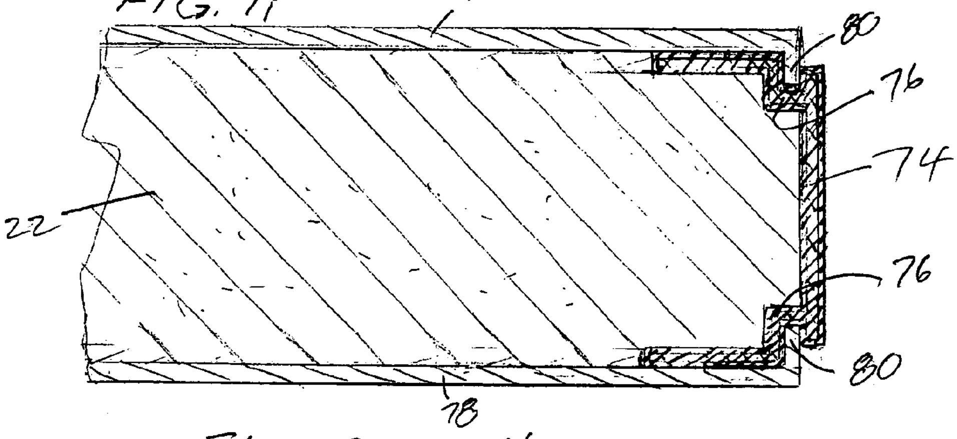
FIG. 11 is a fragmentary section of a door core with a further form of reinforcing band, surface skins and edge trim.
Figure 12:
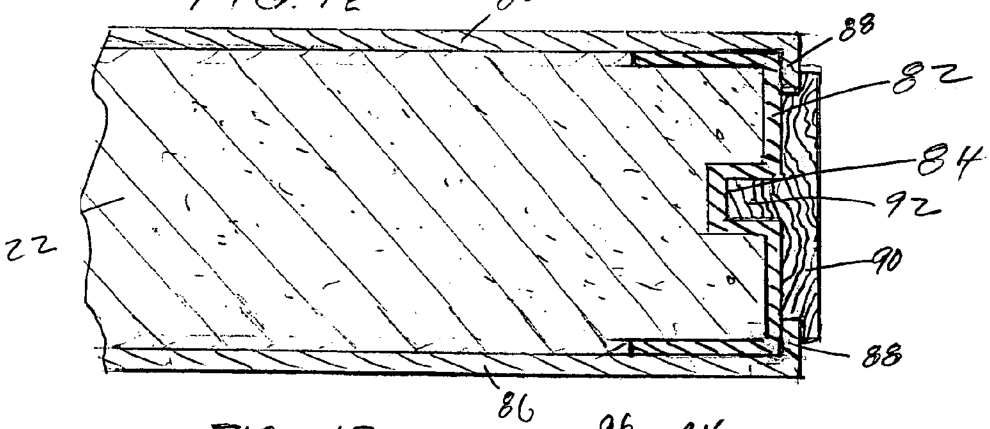
FIG. 12 is a fragmentary section of a door core with yet another form of reinforcing band, surface skins and edge trim.
Figure 13:
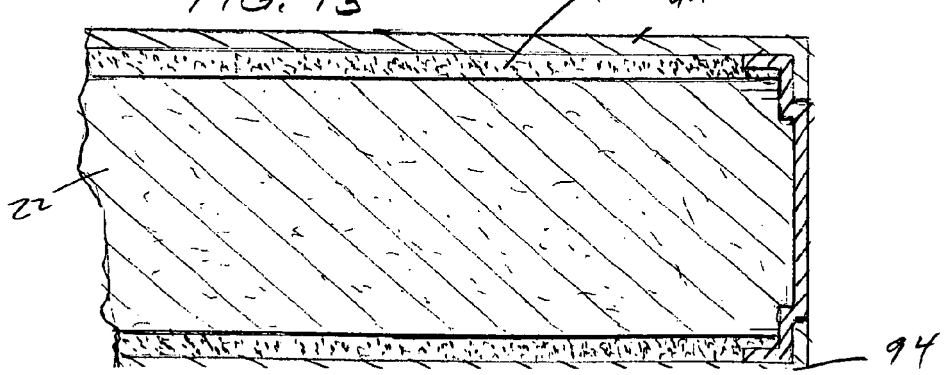
FIG. 13 is a fragmentary section of a door core with a reinforcing band and with urethane foaming adhesive securing surface skins to the door core.

Alternate reinforcing bands and edge treatments are shown in FIGS. 10–12. The reinforcing band 64, FIG. 10, has edges 66 with a negative recess. The skins 68 have edges 70 which are interlocked with band edges 66. Trim strip 72 overlies reinforcing band 64 and the negatively recessed band and skin edges. Reinforcing band 74, FIG. 11, has edges 76 with perpendicular recesses. Skins 78 have edges 80 received in and interlocked with the perpendicular recesses. Reinforcing band 82, FIG. 12, has a longitudinal recess 84. Skins 86 have edges 88 which overlap the reinforcing band 82. Trim strip 90 has a longitudinal rib 92 received in recess 84.

Where the coefficient of thermal expansion of core 22 differs substantially from the coefficient of thermal expansion of the skins, the construction of FIG. 13 may be used. The skins 94 are secured to the surface of core 22 by a polyurethane foam adhesive 96. The foam adhesive accommodates the differential expansion and contraction of core 22 and skins 94. However, manufacture of this door may require use of a clamping fixture to hold the skins in position as the foam adhesive cures.

The preferred AAC core material is superior to other aerated or lightweight concretes in that for a given density it is stronger and therefore easier to work with during manufacture and installation. For most door applications, an AAC material with a density of 37.5 lbs. per cubic foot is suitable. This material has a compressive strength of the order of 580 lbs. per square inch.

What is claimed is:

1. The method of making a concrete core for a door, comprising:

providing a billet of cured, aerated concrete having length and width dimensions approximating the intended height and width dimensions of the door core and a thickness approximating the thickness of a plurality of door cores;

cutting a slab from said billet, the slab having a length and width forming a perimeter and a thickness approximating the intended thickness of the door core;

sizing the slab prior to securing a reinforcing band about the perimeter thereof, the reinforcing band being a channel having two legs, the perimeter of the slab being sized and configured for the internal dimensions and configuration of the band, including the step of providing for inletting the legs into the faces of the slab with the face of one leg flush with the adjacent slab face;

securing the reinforcing band about the perimeter of the slab; and sizing the thickness of the slab by treating the face opposite said adjacent face after securing the band about the perimeter thereof.

2. The method of claim 1 in which the thickness of the slab is sized by sanding.

* * * * *